US011061663B2

(12) United States Patent
Rosner et al.

(10) Patent No.: US 11,061,663 B2
(45) Date of Patent: *Jul. 13, 2021

(54) MEMORY DEVICES, SYSTEMS, AND METHODS FOR UPDATING FIRMWARE WITH SINGLE MEMORY DEVICE

(71) Applicant: Cypress Semiconductor Corporation, San Jose, CA (US)

(72) Inventors: Stephan Rosner, Campbell, CA (US); Sergey Ostrikov, Redwood City, CA (US); Cliff Zitlaw, San Jose, CA (US); Yuichi Ise, Kanagawa (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,177

(22) Filed: Jan. 6, 2020

(65) Prior Publication Data

US 2020/0301698 A1  Sep. 24, 2020

Related U.S. Application Data

(63) Continuation of application No. 16/005,262, filed on Jun. 11, 2018, now Pat. No. 10,552,145.

(Continued)

(51) Int. Cl.
*G06F 9/44* (2018.01)
*G06F 9/445* (2018.01)
(Continued)

(52) U.S. Cl.
CPC .............. *G06F 8/654* (2018.02); *G06F 12/10* (2013.01); *G06F 8/60* (2013.01); *G06F 8/65* (2013.01);
(Continued)

(58) Field of Classification Search
CPC ... G06F 8/654; G06F 8/60; G06F 8/65; G06F 8/71; G06F 2212/1008; G06F 2212/657;
(Continued)

(56) References Cited

U.S. PATENT DOCUMENTS 5,426,769 A   6/1995   Pawloski
5,477,176 A   12/1995  Chang et al.
(Continued)

FOREIGN PATENT DOCUMENTS

KR   20120038901 A   4/2012

OTHER PUBLICATIONS

Lixin Zhang et al., Efficient Address Remapping in Distributed Shared-Memory Systems, Jun. 2006, [Retrieved on Mar. 6, 2021], Retrieved from the internet: <URL: https://dl.acm.org/doi/pdf/10.1145/1138035.1138039> 21 Pages (209-229) (Year: 2006).*

(Continued)

*Primary Examiner* — Anibal Rivera

(57) ABSTRACT

Example apparatus, systems and methods receive a new firmware image at a memory device and place the new firmware image into second nonvolatile storage locations of the memory device such that the second nonvolatile storage locations do not overlap with first nonvolatile storage locations of the memory device that store a current firmware image. Embodiments place a logical address to physical address mapping for the new firmware image into a remap data structure stored in memory circuits of the memory device. The remap data structure also includes a logical address to physical address mapping for the current firmware image. Embodiments provide a first status value to indicate that the logical address to physical address mapping for the new firmware image is a valid firmware image and (Continued)

a second status value to indicate that the logical address to physical address mapping for the current firmware image is an invalid firmware image.

20 Claims, 11 Drawing Sheets

Related U.S. Application Data

(60) Provisional application No. 62/597,709, filed on Dec. 12, 2017.

(51) Int. Cl.

| | | |
|---|---|---|
| *G06F 12/00* | (2006.01) | |
| *G06F 8/654* | (2018.01) | |
| *G06F 12/10* | (2016.01) | |
| *G06F 8/65* | (2018.01) | |
| *G06F 8/71* | (2018.01) | |
| *G06F 8/60* | (2018.01) | |
| *G06F 12/02* | (2006.01) | |
| *G06F 11/10* | (2006.01) | |
| *G06F 12/1009* | (2016.01) | |
| *G06F 11/14* | (2006.01) | |

(52) U.S. Cl.
CPC ............ *G06F 8/71* (2013.01); *G06F 11/1068* (2013.01); *G06F 11/1433* (2013.01); *G06F 11/1441* (2013.01); *G06F 12/0246* (2013.01); *G06F 12/1009* (2013.01); *G06F 2212/1008* (2013.01); *G06F 2212/657* (2013.01)

(58) Field of Classification Search
CPC ...... G06F 12/10; G06F 12/0246; G06F 12/02; G06F 12/1009; G06F 12/0607; G06F 11/1068; G06F 11/1433; G06F 11/0736; G06F 11/3072; G06F 11/1441; G06F 11/108; G06F 11/0775
See application file for complete search history.

(56) References Cited

U.S. PATENT DOCUMENTS

| | | | | |
|---|---|---|---|---|
| 5,596,738 | A * | 1/1997 | Pope ..................... | G06F 8/60 711/103 |
| 6,000,006 | A * | 12/1999 | Bruce .................. | G06F 11/1068 711/103 |
| 6,973,531 | B1 * | 12/2005 | Chang .................. | G06F 12/0246 711/101 |
| 6,985,992 | B1 * | 1/2006 | Chang .................. | G06F 12/0246 365/185.01 |
| 7,698,698 | B2 * | 4/2010 | Skan .................... | G06F 11/1433 717/168 |
| 7,904,895 | B1 | 3/2011 | Cassapakis et al. | |
| 8,296,467 | B2 * | 10/2012 | Lee ....................... | G06F 9/4401 710/5 |
| 8,320,302 | B2 | 11/2012 | Richeson et al. | |
| 8,539,471 | B2 * | 9/2013 | Morton ................. | G06F 8/654 717/168 |
| 8,560,823 | B1 * | 10/2013 | Aytek ..................... | G06F 8/654 713/2 |
| 8,869,138 | B2 | 10/2014 | Bandakka et al. | |
| 9,183,393 | B2 | 11/2015 | Djabarov et al. | |
| 9,274,789 | B2 | 3/2016 | Yuan et al. | |
| 9,459,857 | B2 * | 10/2016 | Gerhart ................... | G06F 8/654 |
| 9,817,652 | B2 | 11/2017 | Choi et al. | |
| 10,282,251 | B2 * | 5/2019 | Gusev .................. | G06F 11/106 |
| 2004/0080985 | A1 * | 4/2004 | Chang .................. | G06F 12/0246 365/185.33 |
| 2004/0177212 | A1 * | 9/2004 | Chang .................. | G11C 16/349 711/103 |
| 2005/0160217 | A1 * | 7/2005 | Gonzalez ............ | G06F 11/1068 711/6 |
| 2007/0061581 | A1 * | 3/2007 | Holtzman ............... | G06F 21/78 713/176 |
| 2007/0073937 | A1 * | 3/2007 | Feinberg ............ | H04N 1/00151 710/62 |
| 2007/0255889 | A1 * | 11/2007 | Yogev ................. | G06F 12/0246 711/103 |
| 2008/0065816 | A1 * | 3/2008 | Seo ........................ | H04W 8/245 711/103 |
| 2008/0147964 | A1 * | 6/2008 | Chow .................... | G06F 21/32 711/103 |
| 2009/0271567 | A1 * | 10/2009 | Huang ................ | G06F 12/0246 711/103 |
| 2009/0320012 | A1 | 12/2009 | Lee et al. | |
| 2010/0262765 | A1 * | 10/2010 | Cheon ................... | G06F 3/0679 711/103 |
| 2011/0072209 | A1 * | 3/2011 | Lund ......................... | G06F 3/00 711/114 |
| 2011/0208975 | A1 * | 8/2011 | Sibert ........................ | G06F 8/65 713/189 |
| 2012/0030665 | A1 * | 2/2012 | Mccarthy ................ | G06F 8/65 717/171 |
| 2012/0151118 | A1 * | 6/2012 | Flynn ................... | G06F 11/1441 711/6 |
| 2012/0210095 | A1 * | 8/2012 | Nellans .................... | G06F 12/10 711/206 |
| 2012/0239889 | A1 * | 9/2012 | Lee ........................ | G06F 3/0659 711/154 |
| 2012/0260138 | A1 * | 10/2012 | Downing, III ...... | G06F 11/0775 714/723 |
| 2012/0284453 | A1 * | 11/2012 | Hashimoto ........... | G06F 3/0634 711/103 |
| 2012/0284587 | A1 * | 11/2012 | Yu .......................... | G06F 3/0631 714/773 |
| 2014/0108703 | A1 * | 4/2014 | Cohen ................... | G06F 3/0655 711/103 |
| 2014/0136753 | A1 * | 5/2014 | Tomlin ................ | G06F 12/0246 711/103 |
| 2014/0281151 | A1 * | 9/2014 | Yu ........................... | G06F 3/064 711/103 |
| 2015/0106556 | A1 * | 4/2015 | Yu ........................ | G06F 13/1694 711/103 |
| 2015/0242201 | A1 * | 8/2015 | Kim ..................... | G06F 8/654 717/168 |
| 2015/0248244 | A1 | 9/2015 | Seo et al. | |
| 2016/0004596 | A1 * | 1/2016 | D'Abreu ............ | G06F 11/108 714/773 |
| 2016/0124740 | A1 * | 5/2016 | Choi ........................ | G06F 8/65 717/168 |
| 2016/0202910 | A1 * | 7/2016 | Ravimohan .......... | G06F 12/0607 711/103 |
| 2016/0210132 | A1 * | 7/2016 | Gerhart ..................... | G06F 8/65 |
| 2016/0291897 | A1 * | 10/2016 | Bae ........................ | G06F 3/0604 |
| 2017/0052734 | A1 * | 2/2017 | Kirchner ................ | G06F 3/0652 |
| 2017/0147216 | A1 * | 5/2017 | Hu .......................... | G06F 3/064 |
| 2017/0168725 | A1 * | 6/2017 | Tamura ................. | G06F 3/0619 |
| 2017/0180137 | A1 * | 6/2017 | Spanier ................. | H04L 9/3236 |
| 2017/0199676 | A1 * | 7/2017 | Choi ................. | G11C 16/3495 |
| 2017/0220404 | A1 * | 8/2017 | Polar Seminario ......................... G06F 11/0736 |
| 2017/0235561 | A1 * | 8/2017 | Butler .................... | G06F 8/654 717/168 |
| 2017/0249155 | A1 * | 8/2017 | Sundrani .............. | G06F 9/4401 |
| 2017/0264481 | A1 | 9/2017 | Chanda et al. | |
| 2018/0067800 | A1 * | 3/2018 | Gusev ..................... | G06F 3/064 |
| 2018/0121106 | A1 * | 5/2018 | Kim ........................ | G06F 3/0611 |
| 2018/0129809 | A1 * | 5/2018 | Zhang .................... | G06F 21/79 |
| 2018/0189508 | A1 * | 7/2018 | Li .......................... | G06F 21/6218 |
| 2018/0217888 | A1 * | 8/2018 | Colgrove .............. | G06F 11/076 |
| 2019/0121543 | A1 * | 4/2019 | Frolikov ................. | G06F 3/064 |
| 2019/0146907 | A1 * | 5/2019 | Frolikov ................. | G06F 3/0679 711/103 |

(56) References Cited

U.S. PATENT DOCUMENTS

2019/0146927 A1* 5/2019 Frolikov ............. G06F 12/0246
711/103
2019/0146931 A1* 5/2019 Frolikov ............... G06F 3/0631
713/193
2019/0179625 A1 6/2019 Rosner et al.

OTHER PUBLICATIONS

Bogdan F. Romanescu et al., Specifying and Dynamically Verifying Address Translation-Aware Memory Consistency, Mar. 13-17, 2010, [Retrieved on Mar. 6, 2021], Retrieved from the internet: <URL: https://dl.acm.org/doi/pdf/10.1145/1736020.1736057> 12 Pages (323-334) (Year: 2010).*
AN1045 Bluetooth® over-the-air device firmware update for EFR32XG1 and BGM11X series products, Silicon Labs; 23 pages.
Dongzhe Ma et al., A survey of address translation technologies for flash memories, Jan. 2014, 39 pages.
Gangyu Sun et al., Memory that never forgets: emerging nonvolatile memory and the implication for architecture design, Aug. 25, 2017, 16 pages.
International Search Report for International Application No. PCT/US2018/061742 dated Mar. 8, 2019; 4 pages.
Maclain Lobdell, Robust over-the-air firmware updates using program flash memory swap on kinetis microcontrollers, Freescale Semiconductor, Jun. 2012; 20 pages.
USPTO Notice of Allowance for U.S. Appl. No. 16/005,262 dated Oct. 16, 2019, 11 pages.
Written Opinion for International Application No. PCT/US2018/061742 dated Mar. 8, 2019; 6 pages.
USPTO Final Rejection for U.S. Appl. No. 16/005,262 dated Jul. 23, 2019, 37 pages.
USPTO Non-Final Rejection for U.S. Appl. No. 16/005,262 dated May 24, 2019, 34 pages.

* cited by examiner

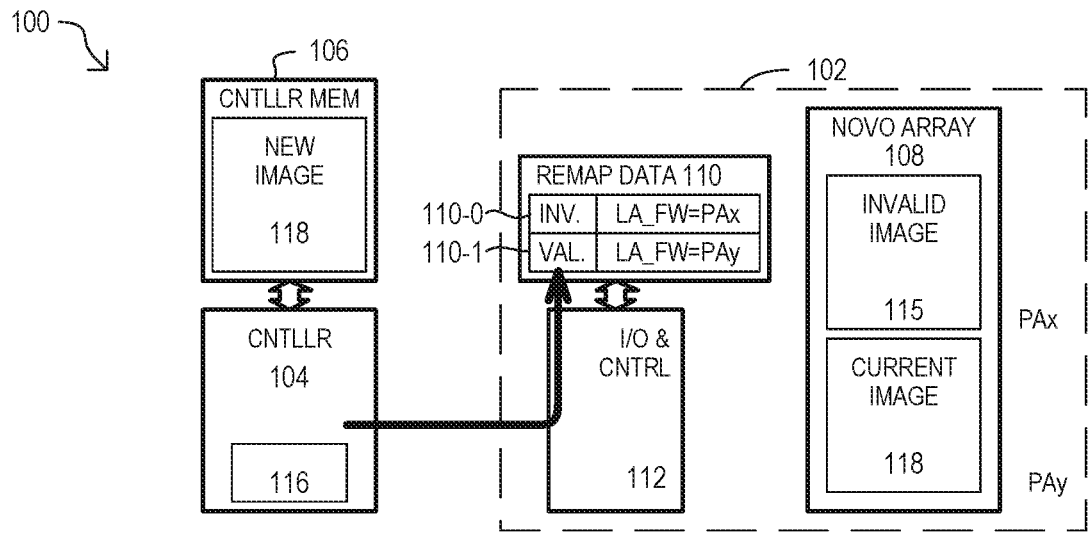
FIG. 1D
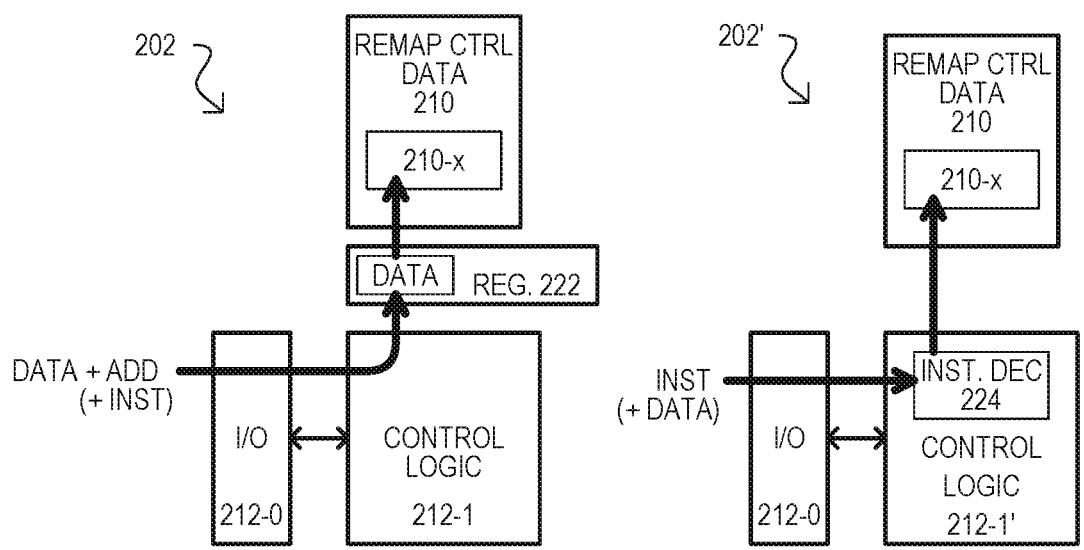
FIG. 2A
FIG. 2B

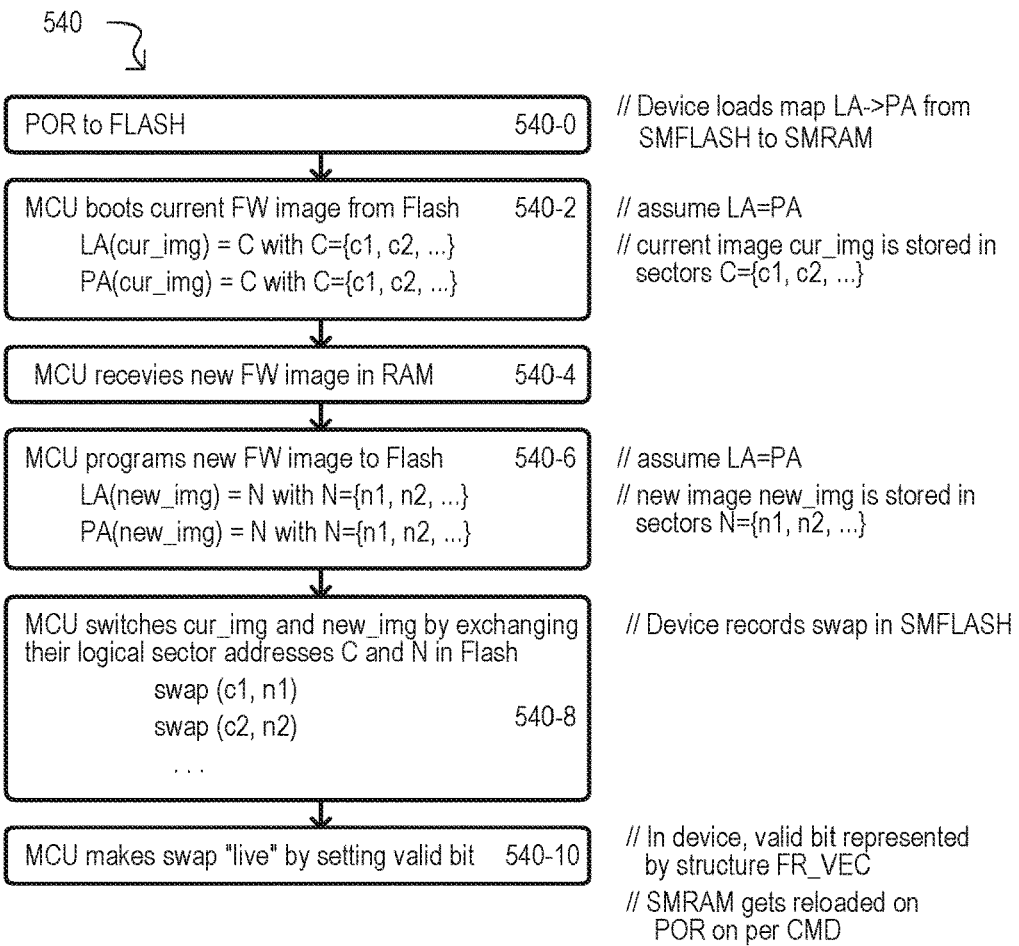
FIG. 5
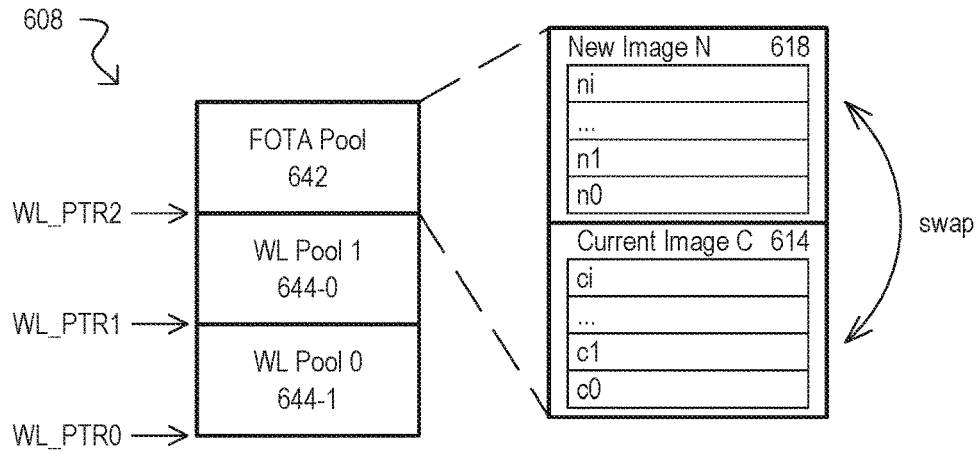
FIG. 6A
FIG. 6B (BACKGROUND)

(BACKGROUND)

MEMORY DEVICES, SYSTEMS, AND METHODS FOR UPDATING FIRMWARE WITH SINGLE MEMORY DEVICE

CROSS REFERENCE TO RELATED APPLICATIONS

The present application is a continuation application of U.S. Non-Provisional application Ser. No. 16/005,262, filed on Jun. 11, 2018, now U.S. Pat. No. 10,552,145 B2 issued on Feb. 2, 2020, which claims the priority and benefit of U.S. Provisional Application No. 62/597,709, filed on Dec. 12, 2017, all of which are hereby incorporated by reference herein in their entirety.

TECHNICAL FIELD

The present disclosure relates generally to systems that update data in nonvolatile memories from time to time, and more particularly to systems that update firmware images for system use, such as systems utilizing firmware-over-the-air (FOTA) methods.

BACKGROUND

Firmware-over-the-air (FOTA), and other firmware update methods, can be a key requirement for computing systems. FOTA updates typically need to be transparent, i.e., old and new FW image are switched instantaneously. Conventionally, systems that need to update firmware employ two or more separate flash memory devices that are mapped (e.g., via use of base registers) into different ranges of a processor address space. A base address of each different address range controls a single chip select, which selects the desired flash memory device. Thus, the instantaneous switch occurs by swapping the base addresses stored in the base address registers.

FIG. 16A shows a conventional system 1691 that includes FOTA updating. System 1691 can include a microcontroller (MCU) 1693 and multiple flash memory devices 1695-0 to -2. Storage locations within flash memory devices (1695-0 to -2) can be mapped to a system address space 1697. Flash memory device 0 1695-0 can correspond to a base address 0x000 and can store an old firmware image 1607-0 (i.e., an outdated version that has since been replaced). Flash memory device 1 1695-1 can correspond to a base address 0x100 and can store a current firmware image 1697-1 (i.e., a version that is currently accessed by the system). Flash memory device 2 1695-2 can correspond to a base address 0x200 and can store a new firmware image 1697-2 (i.e., a version intended to update current image 1697-1).

MCU 1693 can update the firmware image using addressing mechanisms inside the MCU 1693. MCU 1693 can have base address registers 1699 that store base addresses corresponding to firmware images. Base address registers 1699 are used to generate chip select signal CS0-CS2 for flash memory devices 1695-0 to -2, respectively. Base address register "ba_new_image" can store the base physical address of a new firmware image (0x200 before an update). Base address register "ba_cur_image" can store the base physical address of a current firmware image (0x100 before an update). Base address register "ba_old_image" can store the base physical address of an old firmware image (0x000 before an update).

System 1691 can update from a current image (e.g., 1697-1) to the new image (e.g., 1697-2) by exchanging values in the base address registers 1699. In particular, the value in base address register ba_cur_image can be switched from "cfg_cur" to "cfg_new". Following such an operation, when a system 1691 goes to read the firmware, the addressing mechanisms internal to MCU 1693 will access a base address that generates chip select signal CS2 (instead of CS1, as was done prior to the update operation).

FIG. 16B is a block diagram of a conventional system 1691 showing how chip selects are used. MCU 1693 dedicates an output (e.g., I/O) as a chip select (CS1, CS2) for each flash memory device 1695-0/1. As understood from above, such chip selects (CS1, CS2) can be activated according to values in base addresses registers. One flash memory device (e.g., 1695-0) can store a firmware image that is currently in use, while the other flash memory device (e.g., 1695-1) can store a firmware image that is not currently in use (i.e., an old firmware image, or a new firmware image to be put in use by switching base address register values).

A drawback to conventional FOTA approaches can be cost and limitations in performance. If a typical controller (e.g., MCU) is used that dedicates an I/O as a chip select for each flash memory device (i.e., each firmware image), the controller may not have a free I/O for other needed devices, such as dynamic RAM (DRAM) or static RAM (SRAM). As a result, a controller with additional I/Os may have to be used, which can increase costs of system. While conventional systems can connect multiple flash memory devices to the same bus, with each added flash memory device, capacitive loading on the bus can increase. Thus, the larger the number of flash memory devices on the bus, the slower the bus will perform. As but one example, for an Octal SPI bus, adding two flash memory devices can drop maximum bus speed from 200 MHz to 133-166 MHz, as compared the same bus with only one flash memory device.

BRIEF DESCRIPTION OF THE DRAWINGS

FIGS. 1A to 1D are a sequence of block diagrams showing a system and firmware update operations according to an embodiment.

FIGS. 2A and 2B are block diagrams showing how update operations can include a memory device receiving instructions and/or register writes.

FIG. 5 is a flow diagram showing a firmware update operation according to an embodiment.

FIGS. 6A and 6B show a memory cell array configuration that can be included in embodiments.

DETAILED DESCRIPTION

Figure 1A:
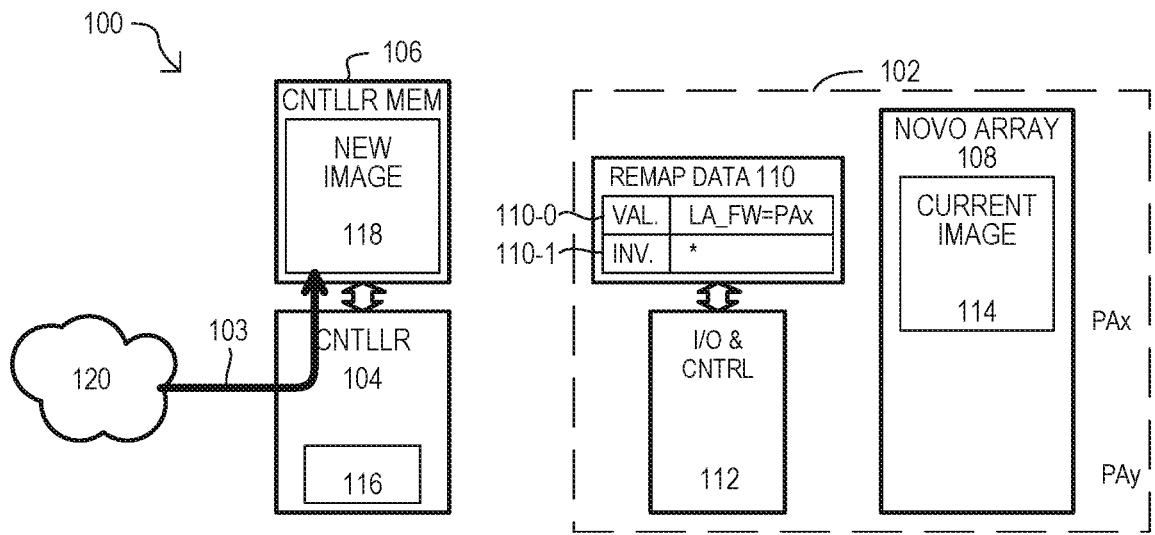

Various embodiments will now be described that show memory devices, systems, and methods for updating firmware of a system. Updates can be performed with a single memory device without copying firmware images between locations on the memory device.

According to embodiments, a new firmware image can be programmed in a same memory device storing a current firmware image. Once the new firmware image is stored, the memory device can make a switch to a new firmware image by operation of a switching operation that uses an internal remapping data structure. Such a switch to a new firmware image can be instantaneous.

In the various embodiments below, like items are referred to by the same reference characters, but with the leading digit(s) corresponding to the figure number.

FIGS. 1A to 1D are a series of flow diagrams showing a system 100 and a corresponding firmware update operation. A system 100 can include a memory device 102, a controller 104, and controller memory 106. A memory device 102 can include a nonvolatile memory array 108, remap data structure 110, and input/output (I/O) and control circuit 112. Nonvolatile memory array 108 can include a number of nonvolatile memory cells that can store data in a nonvolatile manner. That is, in the absence of power, stored data values can be retained. Storage locations are accessible via a physical address (PA). Nonvolatile memory array 108 can include any suitable type of nonvolatile memory cells, but in some embodiments can include "flash" type memory cells. Nonvolatile memory array 108 can have sufficient storage capacity for at least two or more firmware images.

Remap data structure 110 can store data that records a logical address to physical address (LA→PA) mapping of firmware images, as well as a status for each such LA→PA mapping. For example, entry 110-0 stores a mapping (LA_FW=PAx) that is valid, as shown by the VAL indication. Entry 110-1 stores a mapping that is not valid, as shown by the INV indication. It is noted that remap data structure 110 resides on the memory device 102, and stores data in a nonvolatile fashion. As will be shown in other embodiments below, in some embodiments, remap data structure 110 can include a LA→PA look-up or other structure that is stored in volatile memory (not shown) for fast translation between logical and physical addresses. Remap data structure 110 can utilize nonvolatile memory cells located outside of nonvolatile memory array 108 and/or nonvolatile memory cells located within nonvolatile memory array 108.

In some embodiments, memory device 102 can be a single integrated circuit device. In such an arrangement, nonvolatile memory array 108, remap data structure 110, and I/O and control circuit 112 can be part of the same integrated circuit package. In particular embodiments, nonvolatile memory array 108, remap data structure 110 and I/O and control circuit 112 can be part of the same integrated circuit substrate (i.e., formed in a single "chip").

I/O and control circuit 112 can enable access to nonvolatile memory array 108 and remap data structure 110. For accesses to firmware stored in nonvolatile memory array 108, I/O and control circuit 112 can use remap data structure 110 to determine which LA→PA mapping is valid, and then use such a mapping to direct logical addresses to physical addresses of the valid firmware image.

In some embodiments, in response to predetermined actions (e.g., power-on/reset POR, a received instruction, a register setting), memory device 102 can access remap data structure 110 to create a LA→PA mapping structure in volatile memory (not shown).

A controller 104 can include logic circuits for executing various functions of system 100. In some embodiments, controller 104 can include one or more processors and related circuits that can execute stored instructions 116. However, alternate embodiments can include any other suitable circuits, including custom logic and/or programmable logic. A controller 104 can have access to a controller memory 106 which is different from memory device 102. A controller memory 106 can be formed of any suitable memory circuits, and in particular embodiments can be a volatile memory, such as dynamic random access memory (DRAM) or static RAM (SRAM).

Having described components of a system 100, an update operation for system 100 will now be described.

Referring to FIG. 1A, a system 100 may initially store a current firmware image 114 in nonvolatile memory array 108 starting at a physical address PAx. During system operations, the current firmware image 114 is read from memory device 102 by I/O and control circuit 112 translating logical addresses (which can start at LA_FW) to physical addresses (which can start at PAx) by accessing remap data structure 110.

Referring still to FIG. 1A, a system 100 can receive a new firmware image (shown by action 103). Controller 104 can store the new firmware image 118 in controller memory 106. New firmware image 118 can be received from a network 120. In some embodiments, network 120 can be a wireless network, and an update operation can be a FOTA operation.

Figure 1B:
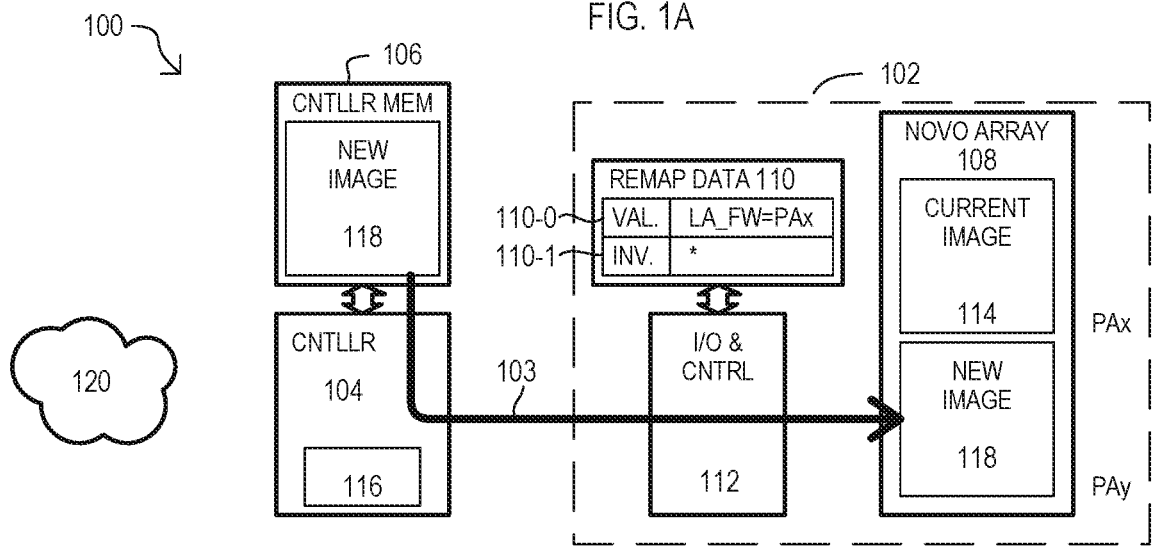

Referring to FIG. 1B, controller 104 can program the new firmware image 118 into nonvolatile memory array 108. It is understood that new firmware image 118 is programmed into physical locations not occupied by current firmware image 114. In the embodiment shown, new firmware image 118 can occupy a range of a physical addresses starting at PAy that do not overlap with the physical addresses storing the current firmware 114 starting at PAx. New firmware image 118 can be programmed according to any technique suitable for the type and architecture of the nonvolatile memory array 108. In some embodiments, physical addresses for new firmware image 118 can be generated by controller 104. However, in other embodiments, such physical addresses can be generated by I/O and control circuit 112 in response to one or more instructions from controller 104.

Figure 1C:
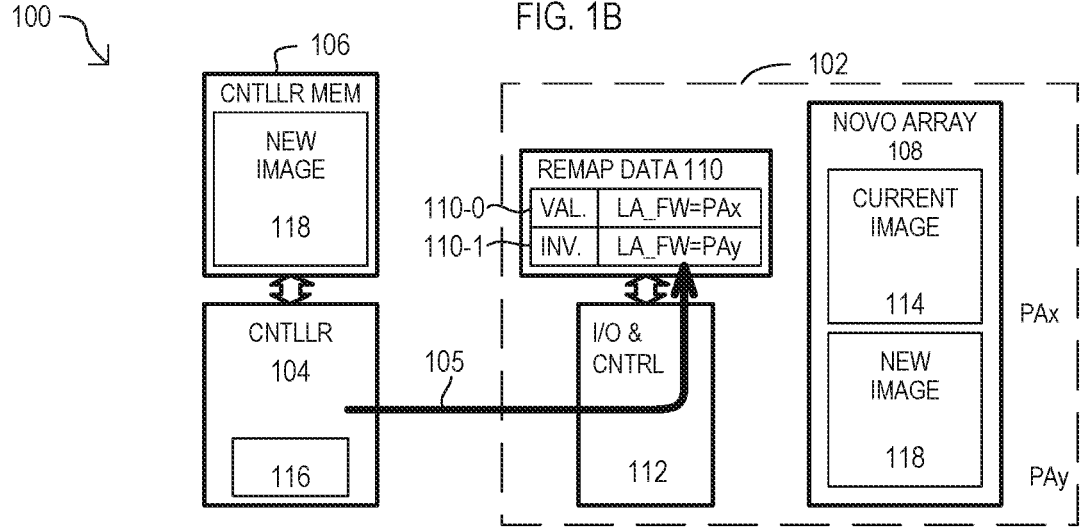

Referring to FIG. 1C, controller 104 can also program a logical to physical address mapping of the new firmware image 118 into remap data structure 110. Such an action is shown in FIG. 1C by "LA_FW=PAy" being programmed into entry 110-1. In this way, logical address intended to access firmware for the system 100 can be assigned physical addresses of the new image 118. However, as shown in FIG. 1C, such a mapping will not be effect, as entry 110-1 continues to have an invalid status.

Referring to FIG. 1D, controller 104 can make a new firmware image "live" by programming the new mapping entry to be valid. Such an action is shown in FIG. 1D by entry 110-1 being changed to valid (VAL.) and entry 110-0 becoming invalid. As shown in nonvolatile memory array 108, once the new mapping is live, the firmware image at PAx becomes an invalid (e.g., outdated) firmware image 115, and the firmware image 118 at PAy becomes the current firmware image, to be accessed by the system.

Once a new firmware image becomes valid (e.g., is live), it can be accessed immediately, or in response to predetermined conditions. As but a few of many possible examples, the new mapping can take effect after any or all of the following: a next power-up or reset (POR) operation of the device or system, the memory device 102 receiving a predetermined instruction, or a predetermined value being written into a configuration register (not shown) of the memory device 102.

An operation like that shown in FIGS. 1A to 1D can enable an update to firmware to be transparent and immediate, and not require a copying of data between locations within a same memory device. It is noted that in some embodiments, a memory device 102 can retain two locations for firmware, and "swap" between the two with each new firmware image. However, in other embodiments a memory device 102 can include more than two storage locations for firmware, and cycle among the various locations as new firmware is received.

While a controller 104 can track the physical addresses for firmware locations, in some embodiments, I/O & control logic 112 can handle such tasks, generating physical addresses for firmware data values received from a controller 104.

Embodiments shown herein can include various actions executed by a memory device, including the programming of firmware data into nonvolatile memory array locations, the programming of values into a remap data structure (e.g., LA to PA mapping data, status values, etc.), and making a new version of the firmware "live" (i.e., available to the system). While such actions can be accomplished in any suitable way, FIGS. 2A and 2B show two approaches according to embodiments.

FIGS. 2A and 2B are block diagrams of memory devices 202 and 202'. In particular embodiments, memory devices 202/202' can be particular implementations of those shown as 102 in FIGS. 1A to 1D.

FIG. 2A shows the writing of data to a configuration register 222 in a memory device 202. Memory device 202 can include an I/O circuit 212-0, control logic 212-1, remap data structure 210, and a configuration register 222. A data value DATA can be written to configuration register 222 to start or enable an action in a firmware update operation. As but a few examples, according to the register setting any or all of the following can happen: a new firmware image can be made "live", PA→LA mapping data (210-x) can be programmed, the memory device can be placed into a mode which enables PA→LA mapping data to be programmed, the memory device can be placed into a mode which enables a controller to program the new firmware into storage locations (i.e., access physical addressing). Writing to the configuration register 222 can include providing memory device with data and a register address (DATA+ADD). Further, such an action can also include an instruction (e.g., write register, etc.).

FIG. 2B shows a memory device 202' receiving particular instructions for firmware update operations. Memory device 202' can include the same items as that of FIG. 2A. However, unlike FIG. 2A, actions in a firmware update operation can be effected by a dedicated instruction to the memory device 202'. Accordingly, control logic 212-1' can include an instruction decoder 224. In response to one or more instructions, control logic 212-1' can perform any of the actions noted for the register write of FIG. 2A (i.e., make new firmware live, etc.). In some embodiments, an instruction (INST) can be accompanied by one or more data values (+DATA).

Figure 3:
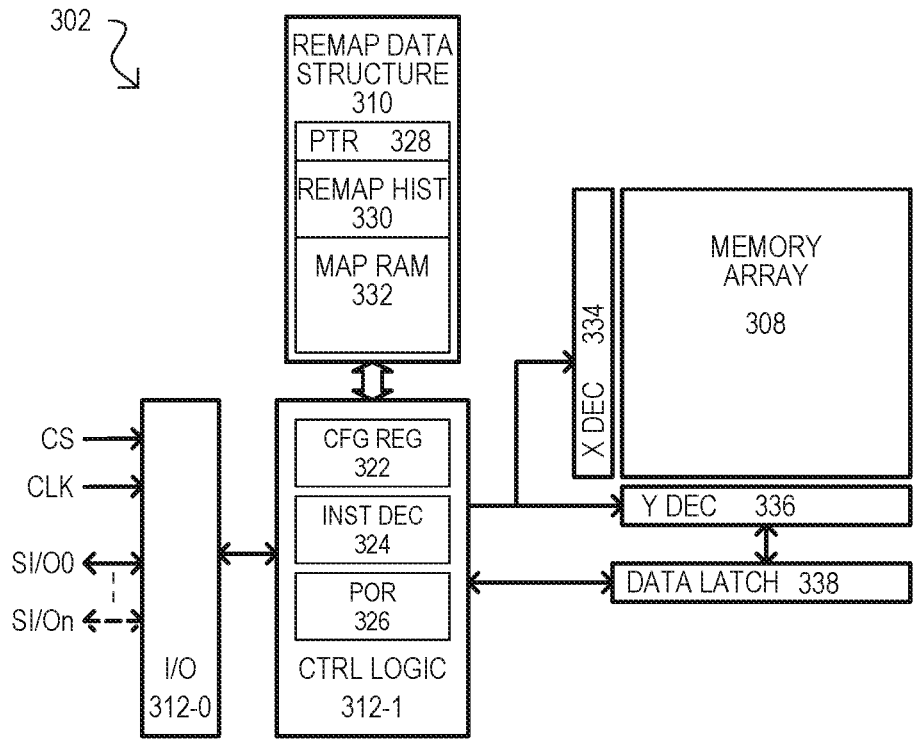
FIG. 3 is a block schematic diagram of a memory device according to an embodiment.

FIG. 3 is a block diagram of memory device 302 according to a further embodiment. In particular embodiments, FIG. 3 can be one implementation of that shown as 102 in FIGS. 1A to 1D, or those shown in FIGS. 2A/B.

Memory device 302 can include an I/O circuit 312-0, control logic 312-1, remap data structure 310, a memory cell array 308, X and Y decoders 334 and 336, and data latch 338. I/O circuit 312-0 can provide any suitable interface for memory device 302, and in the very particular embodiment shown, can include a chip select input CS, a clock input CLK, a serial I/O (SI/O0), and optionally one or more additional serial I/Os (SI/On). According to well understood techniques, a memory device 302 can be accessed by an active CS signal, and can receive any of instructions, address values, or data values on SI/O0 (and SI/On) in synchronism with a clock received at CLK. However, such a particular interface should not be construed as limiting. Alternate embodiments can include an I/O circuit with various interfaces, including those with dedicated address and data lines, asynchronous timing, parallel buses, etc.

Remap data structure 310 can store data, in a nonvolatile fashion, to track and enable access to a latest firmware image. In the embodiment shown, remap data structure 310 can include pointer data 328, remap history data 330, and a map memory 332. Remap history data 330 can store LA→PA mapping data for each new firmware image as it is programmed into memory cell array 308. Thus, remap history data 330 can store a history of all mappings for a particular firmware (where an oldest entry may eventually be overwritten). Pointer data 328 can point to the most recent remap history data entry, and thus the entry of the most recent firmware image. Data in map memory 332 can be accessed at a faster speed than remap history data 330 and can be configured to provide rapid LA→PA conversion. In some embodiments, map memory 332 can be a volatile memory structure that is populated with remap history data 330 pointed to by pointer data 328. In some embodiments, pointer data 328 and remap history data 330 are stored in nonvolatile memory circuits. Such nonvolatile memory circuits can be part of memory cell array 308 or separate from memory cell array 308. Map memory 332 can include volatile memory circuits, such as SRAM and/or DRAM.

Control logic 312-1 can execute operations of the memory device 302 according to signals received at I/O circuit 312-0. In the embodiment shown, control logic 312-1 can include POR circuit 326, instruction decoder 324, and configuration registers 322. POR circuit 326 can detect and/or initiate a power-on or reset operation. Instruction decoder 324 can decode instructions received at I/O circuit 312-0. Configuration registers 322 can store configuration data that can dictate how memory device 302 operates. In some embodiments, a new firmware image can be placed in operation in response to any of: POR circuit 326 detecting a power on or reset event, the decoding of one or more instructions by instruction decoder 324, or the writing of a predetermined data value into configuration registers 322. Placing the new firmware image into operation can include control logic 312-1 accessing pointer data 328 to find the LA→PA mapping for the most recent firmware from remap history data 330. Control logic 312-1 can then create a LA→PA lookup structure in map memory 332 from the remap history data 330. Control logic 312-1 then accesses map memory 332 to service read requests made to firmware logical addresses.

A memory cell array 308 can include nonvolatile memory cells accessed according to physical addresses decoded by X and Y decoders (334/336). Nonvolatile memory cells can be of any suitable technology, and in particular embodiments can be single transistor "flash" type memory cells. Memory cell array 308 can have any suitable organization, and in particular embodiments can be organized in sectors.

Data latch 338 can store read data received from memory cell array 308 for output by control logic 312-1 over SI/O0 (and SI/On if present). Data latch 338 can also store write data received over SI/O0 (and SI/On if present), for programming into memory cell array 308 by control logic 312-1.

Figure 4:
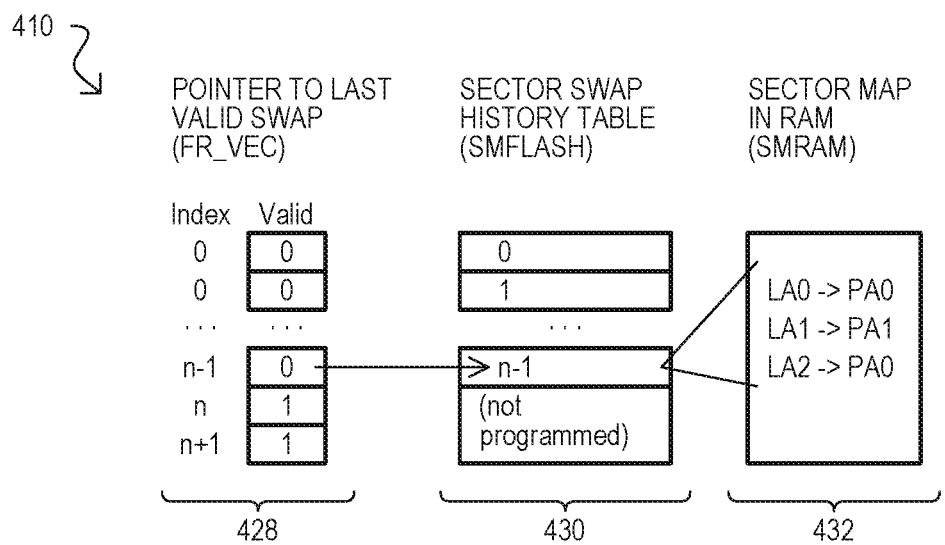
FIG. 4 is a diagram showing a memory device remap data structure according to an embodiment.

FIG. 4 is a diagram showing a remap data structure 410 according to one particular embodiment. Remap data structure 410 can be one particular implementation of those shown for other embodiments herein. Remap data structure 410 can include pointer data (FR_VEC) 428, remap history data (SMFLASH) 430, and map memory (SMRAM) 432. Pointer data 428 can include a bit value that indexes to each entry in remap history data 430. The last bit value of pointer data 428 having a "0" value can be the latest entry. Thus, in FIG. 4, pointer data 428 indexes to entry "n−1" as storing the LA→PA mapping for the newest firmware version. Thus, the data stored in map memory 432 is understood to be derived from data stored in entry n−1 of remap history data 430.

When a new firmware image is received, its LA→PA mapping can be programmed into entry "n", and to make such a new firmware image "live" the pointer bit value for index n can be changed from 1 to 0.

Having described various systems, devices, and corresponding methods above, another method will now be described with reference to FIG. 5. FIG. 5 is a flow diagram of a method 540 of updating firmware with a controller and a single memory device. A method 540 can be executed by any of the systems described herein, and equivalents. In method 540 a memory device can be flash memory device, but other embodiments can include nonvolatile storage based on any other suitable technology.

Method 540 can include a memory device experiencing an initializing event, which in the embodiment shown can be a POR type event 540-0. In response to such an event, a memory device can load an LA→PA mapping from a remap history (e.g., SMFLASH) into map memory (e.g., SMRAM). Other initializing events that can result in the same operation (populating SMRAM) can include specific instructions or commands to the memory device, or the setting of one or more configuration registers of the memory device, as but a few examples.

A controller (e.g., MCU) can boot a current firmware image 540-2. Such an action can include a controller setting LAs to values of the last known firmware image. In addition, a controller may also have record of the physical addresses (in the memory device) of the latest image. In the embodiment shown, it is assumed that current logical addresses equal the current physical addresses. In FIG. 5, the current firmware image is understood to be stored in sectors "C" which includes physical addresses c1, c2, etc.

A controller can receive a new firmware image 540-4. Such an action can include any of those described herein, or equivalents, including receiving the new firmware image over a wireless connection and storing it in a controller memory (RAM).

A controller can program the new firmware into the memory device 540-6. Such an action can include the controller assigning and recording logical and physical addresses for the data. In the embodiment shown, it is assumed that the assigned logical addresses equal the assigned physical addresses. In FIG. 5, the new firmware image is understood to be stored in sectors "N" which includes physical addresses n1, n2, etc. Sectors "N" are understood to be different from and not overlap with sectors "C". Action 540-6 shows how in some embodiments, the LA→PA mapping can be exposed to an application/user.

A controller can then update remap history data (SMFLASH) on the memory device to store the new firmware image location 540-8. Such an action can include a controller exchanging logical addresses of the current firmware image with those of the new firmware image. In FIG. 5, this can include multiple logical address swaps.

A method 540 can further include a controller making the firmware update "live" by setting a valid bit in the memory device 540-10. In FIG. 5 this can include setting a bit in a data structure like that of FIG. 4 (i.e., a bit value in pointer FR_VEC).

With the new firmware image live, when the memory device experiences another initializing event 540-0 (e.g., POR, special instruction/command, configuration register write), the controller will boot the new image, i.e., LA(cur_img)=N with N=(n1, n2, . . . ). The firmware update is thus immediately in effect.

FIGS. 6A and 6B are diagrams showing configurations for a memory cell array 608 that can be included in embodiments. FIG. 6A shows a memory cell array 608 that is physically divided into different pools 642, 644-0, 644-1. Each pool (642, 644-0, 644-1) is addressable by a pointer (WL_PTR0 to 2), which can point to a base address for the pool. One pool 642 can be designated as a firmware pool 642, having a size that can accommodate at least two firmware images. As shown, firmware pool 642 can be programmed with a new firmware image 618 (at physical addresses n0 to ni) while still storing a previous firmware image 614 (at physical addresses c0 to ci). In some embodiments, as firmware is continually updated, locations can be swapped. For example, once new firmware image 618 is made live, it will become the current firmware image, and the next, new firmware image will be programmed at physical addresses c0 to ci.

FIG. 6B shows a swapping operation. A logical address for a new firmware image is stored as a temporary value (tmp=LA(new_img)). The logical address for a new firmware image is set to that of the current firmware image (LA(new_img)=LA(cur_img)). Such an action designates the (now outdated) current firmware image, as the destination for the next, new firmware image. The newly received firmware image is then set as the current firmware image (LA(cur_img)=tmp).

Of course, in other embodiments, a firmware pool 642 can accommodate more than two firmware images, and thus updates will rotate through address ranges rather than swap between just two address ranges.

Referring back to FIG. 6A, in some embodiments, the pools (642, 644-0, 644-1) can be wear leveling pools. A memory device that includes memory cell array 608 can change logical to physical address mapping to even out wear among the pools. In some embodiments, a firmware pool 642 can be treated as any other pool (e.g., 644-0/1) in a wear leveling operation. That is, once accesses to firmware pool 642 have exceeded some predetermined threshold, a new pool (e.g., 644-0/1) can be designated as the firmware pool. In such embodiments, firmware images can be stored in a same pool to avoid losing mapping data if a wear leveling operation cycles a pool out of operation and substitutes it with a different pool.

Figure 7:
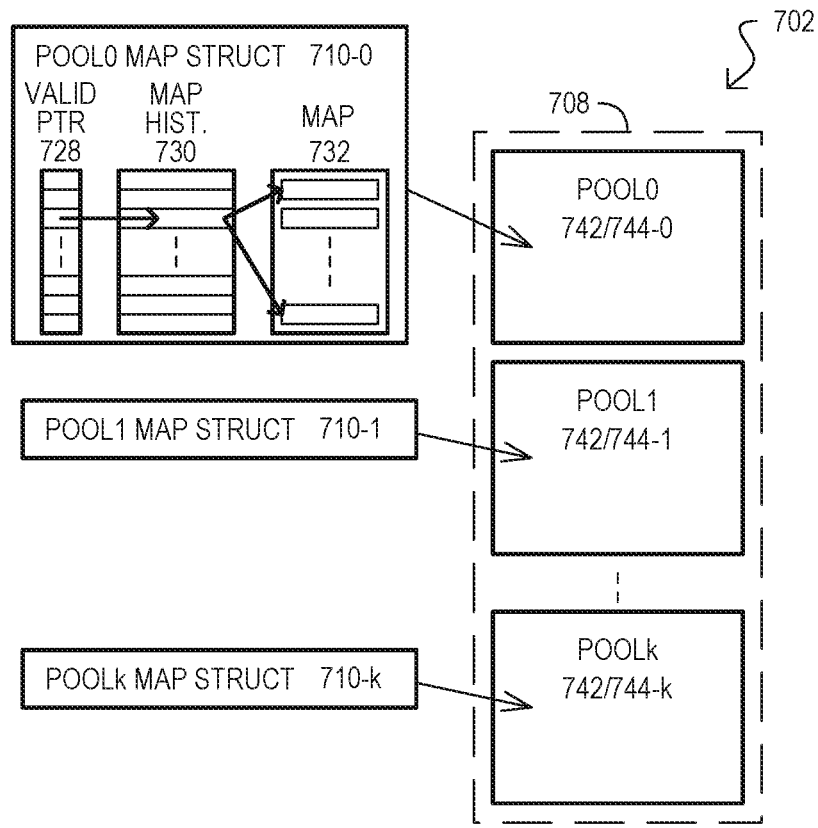
FIG. 7 is a block diagram showing data structures and a corresponding memory cell array that can be included in embodiments.

Referring to FIG. 7, a memory device 702 according to another embodiment is shown in a block diagram. A memory device 702 can be one particular implementation of any of those shown herein. A memory device 702 can include a memory cell array 708 divided into pools 742/744-0 to -k. For each pool (742/744-0 to -k) there can be corresponding remap structure 710-0 to -k. Remap structures (710-0 to -k) can take the form of any of those described herein, or equivalents, and in FIG. 7 are shown to have a structure like that of FIG. 4.

In some embodiments, pools (742/744-0 to -k) can be wear leveling pools, and thus subject to be rotated out of use based on wear leveling criteria. In memory device 702 of FIG. 7, any pool (742/744-0 to -k) can serve as firmware pool as there is a corresponding remap data structure for that pool.

Figure 8:
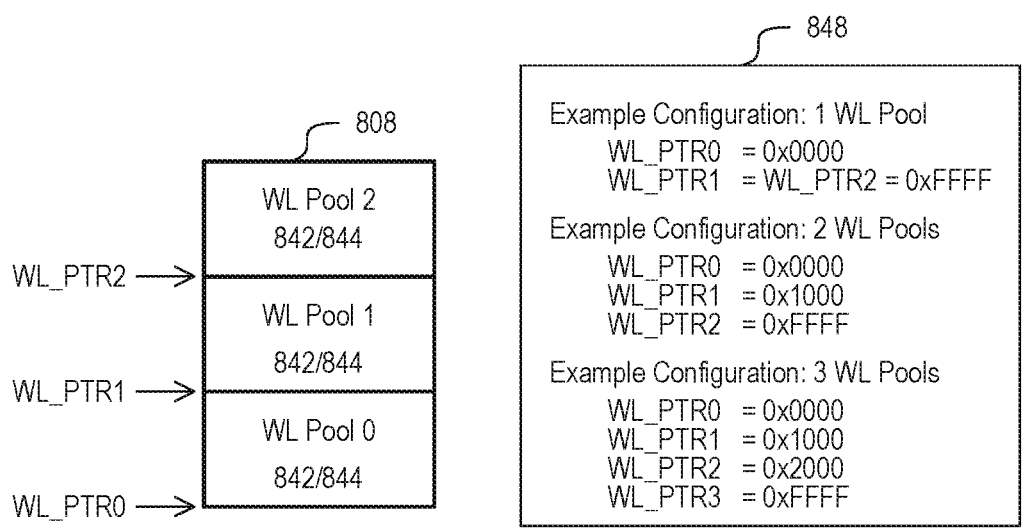
FIG. 8 shows a memory cell array that can be divided into a varying number of pools which can be included in embodiments.

In some embodiments, a memory cell array can have physical regions of programmable size. FIG. 8 shows one example of such a memory cell array 808. Memory cell array 808 can include a number of storage locations dividable into different regions, shown as pools 842/844. A size and physical location of the pools can be programmable according to a pointer value (WL_PTR0 to -2), which can point to a base physical address. In some embodiments, such pools can be wear leveling pools. Thus, accesses to such pools can be monitored or otherwise tracked to cycle out a pool that has been subject to more use than other pools, and remap addresses to a new, less worn pool.

FIG. 8 includes examples 848 of how a memory cell array 808 can be divided using pointer values (WL_PTR0 to -2). Examples 848 include only one pool, two pools, and three pools. Of course, any number of pools could be created, provided sufficient pointer values are available. In such an arrangement, a pool can be adjusted in size according to firmware size (i.e., made large enough to store at least two images).

According to embodiments, memory devices can store mapping data structures which can be accessed and revised to enable rapid switching from a current firmware image to a newly received firmware image. While memory devices can be accessed in any suitable way, and according to any suitable protocol, in some embodiments a memory device can be accessed with a chip select signal (CS) and one or more I/O lines. FIGS. 9A to 9D are timing diagrams showing inputs signals to a memory device for updating firmware according to embodiments. In response to such input signals, a memory device can perform any of: make a new firmware image "live", update remap history data (e.g., add a new LA→PA mapping), prepare the memory device for the programming of a new firmware image.

Each of FIGS. 9A to 9D shows waveforms for a chip select signal (CSB) and I/O signal(s) (I/O). An I/O can be one I/O line of the memory device, or multiple such I/O lines. In the example shown, data on I/O lines can be received in synchronism with a clock CLK. A data rate for data received on I/O can take any suitable form, including single data rate (one bit cycle), double data rate (two bits per cycle), quad data rate (two bits per cycle on two I/O lines), or octal data rate (two bits per cycle on four I/O lines).

Figure 9A:
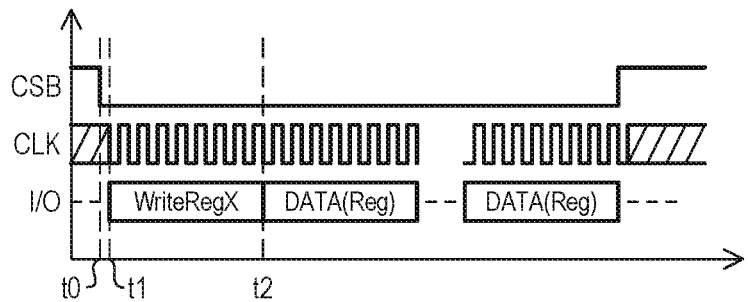
FIGS. 9A to 9D show inputs to a memory device for updating firmware according to embodiments.

FIG. 9A shows a register write instruction. At time t0, a chip select signal can go active. At time t1, memory device can receive an instruction "WriteRegX". This can be followed by configuration data (DATA(Reg)) at time t2. In response to such an instruction, a memory device can write DATA(Reg) into one or more registers indicated by the instruction WriteRegX. Writing data into such registers can control, provide data for, or initiate firmware update operations as described herein, or equivalents.

Figure 9B:
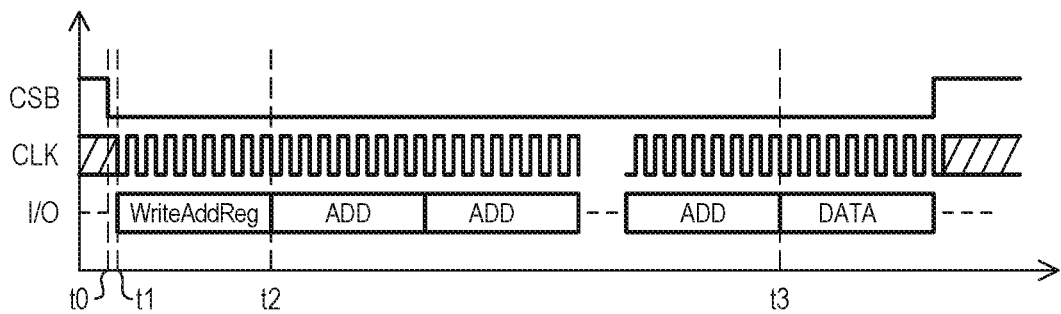

FIG. 9B shows an addressable register write instruction. At time t0, a chip select signal can go active. At time t1, memory device can receive an instruction "WriteAddReg". This can be followed by address data (ADD) at time t2, and then configuration data DATA at time t3. In response to such an instruction, a memory device can write DATA into the register indicated by the address data (ADD). Writing data to such a register can control, provide data for, or initiate firmware update operations as described herein, or equivalents.

Figure 9C:
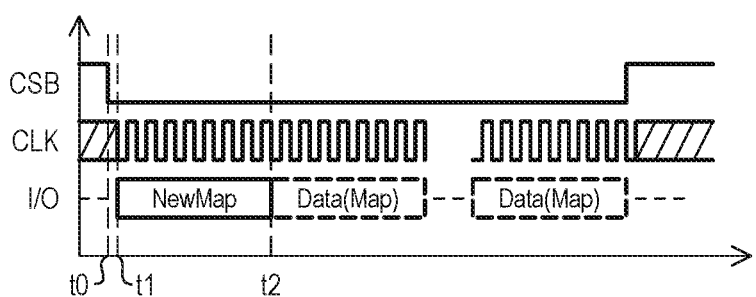

FIG. 9C shows a mapping instruction according to an embodiment. At time t0, a chip select signal can go active. At time t1, a memory device can receive an instruction "NewMap". This can be followed by data (DATA(Map)) at time t2. In response to such an instruction, mapping data (e.g., LA→PA mapping) for a new image can be stored in a remap history data structure, as described herein, or equivalents. Values DATA(Map) can include the mapping data.

Figure 9D:
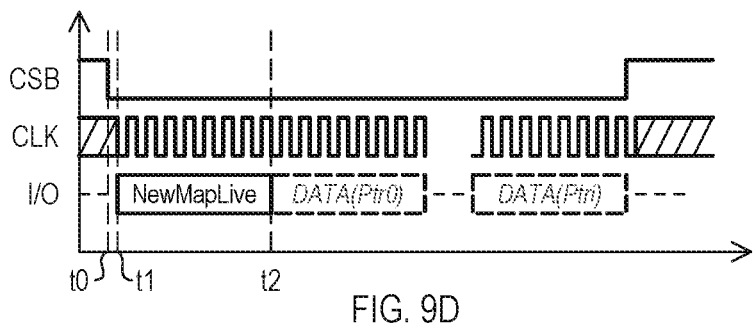

FIG. 9D shows an instruction to make a new firmware image live according to an embodiment. At time t0, a chip select signal can go active. At time t1, a memory device can receive an instruction "NewMapLive". Optionally, this can be followed by data (DATA(Ptr)). In response to such an instruction, a newest set of mapping data can be indicated as the firmware image that is to be provided going forward. In some embodiments, no data is needed, as a memory device control logic can update the value for the new mapping set. However, in other embodiments, DATA(Ptr) can be used to program a remap data structure (e.g., pointer values). Such an instruction can swap between firmware images in an atomic, immediate fashion.

Figure 10:
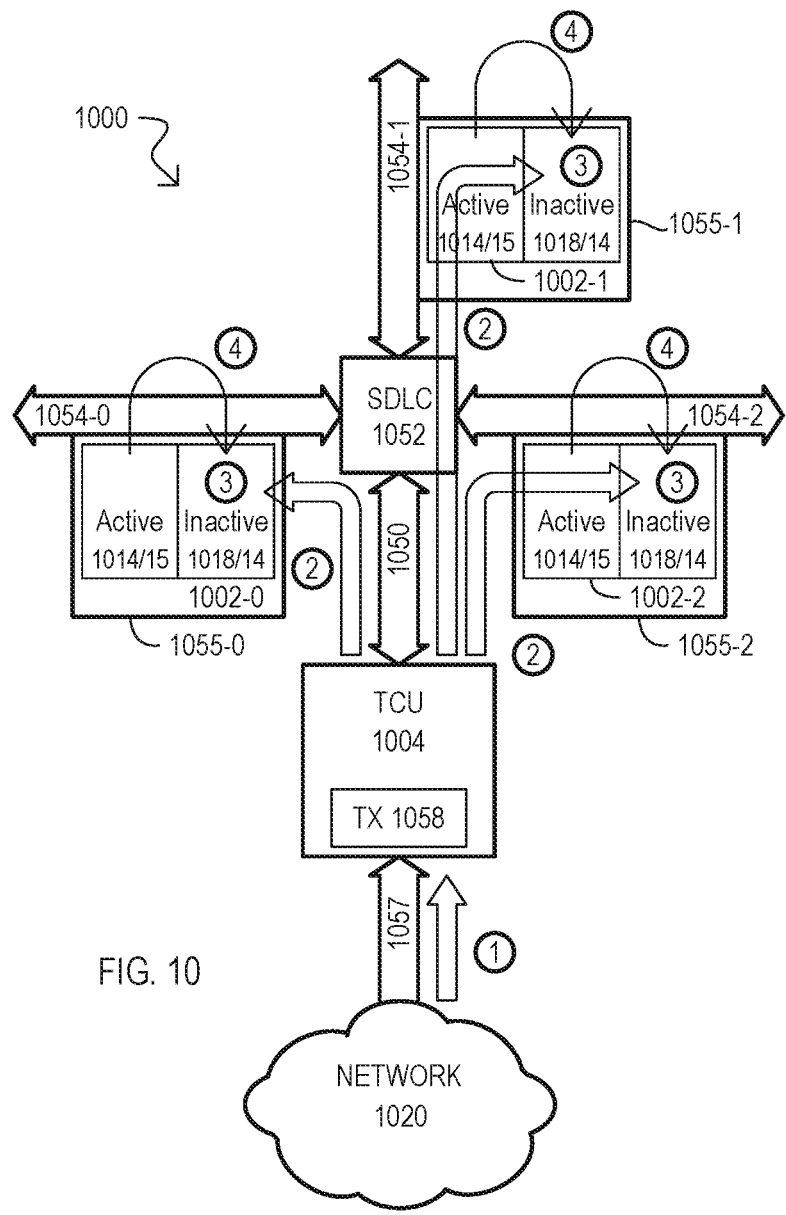
FIG. 10 shows a system that can include firmware-over-the-air (FOTA) updating according to an embodiment.

While embodiments can include systems, devices and methods that involve the update of firmware for a device or module, embodiments can also include systems having multiple devices/modules that can each require their own firmware update. FIG. 10 is a block diagram of one such system 1000.

A system 1000 can include a telematics control unit (TCU) (e.g. controller) 1004, a controller bus 1050, a systems development life cycle section 1052, module buses 1054-0 to -2, and modules 1055-0 to -1. Each of modules (1055-0 to -1) operates with firmware stored in a memory device 1002-0 to -2. A TCU 1004 can include a processor which can issue instructions to memory devices (1002-0 to -2). TCU 1004 can also include a wireless transceiver (or receiver) 1058 for receiving firmware updates via a wireless network. In particular embodiments, a system 1000 can be an automobile control system, and TCU 1004 may further include a global positioning system (GPS), one or more processors, and a controller memory.

While FIG. 10 shows separate module buses 1054-0 to -2, in other embodiments, more than one module can be connected to a same bus. Further, in other embodiments, a controller bus 1050 can be the same as a module bus (1054-0 to -2).

Having described various components of system 1000, FOTA operations for the system 1000 will now be described.

Initially, memory devices 1002-0 to -2 can each store a current firmware image 1014/1015 (that is to be updated).

At ①, TCU 1004 can receive new firmware at wireless transceiver 1058 that is transmitted over a wireless connection 1057 of network 1020. A network 1020 can be any suitable network, and in some embodiments can be the Internet and/or a cellular network. In the example shown, new firmware can be received for all modules 1055-0 to -2.

However, it is understood that in other update operations fewer numbers of modules may be updated.

At ②, TCU 1004 can transmit the new firmware images to the respective memory devices 1055-0 to -2. Such an action can include TCU 1004 sending new firmware image over controller bus 1050 and module buses 1054-0. In one embodiment, such an action can include transmitting data over a controller area network (CAN) type bus.

At ③, modules 1055-0 to -2 can program a new firmware image 1018/14 into locations of the corresponding memory device 1002-0 to -2. Such an action can include any of those described herein, or equivalents. In one particular embodiment, new firmware image 1018/14 can be programmed into a "secondary" memory page of the memory device (the primary memory page storing the current firmware 1014/15). In some embodiments, the programming of the new firmware image can be accomplished with a processor (not shown) local to the module 1055-0 to -2. However, in other embodiments, such programming can be performed by TCU 1004.

At ④, the new firmware images 1018/1014 can be made "live" (and the other firmware images 1014/1015 designated as inactive). Such an action can be in response to inputs received from a TCU 1004. Such inputs can include, but are not limited to, instructions or register writes as described herein, or equivalents, as well as out-of-band signaling or actions by a processor local to modules 1055-0 to -2, or any other suitable signaling method.

Figure 11:
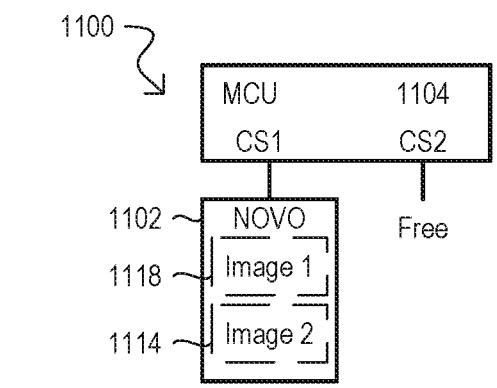
FIG. 11 is a block diagram of a system according to an embodiment.
Figure 16A:
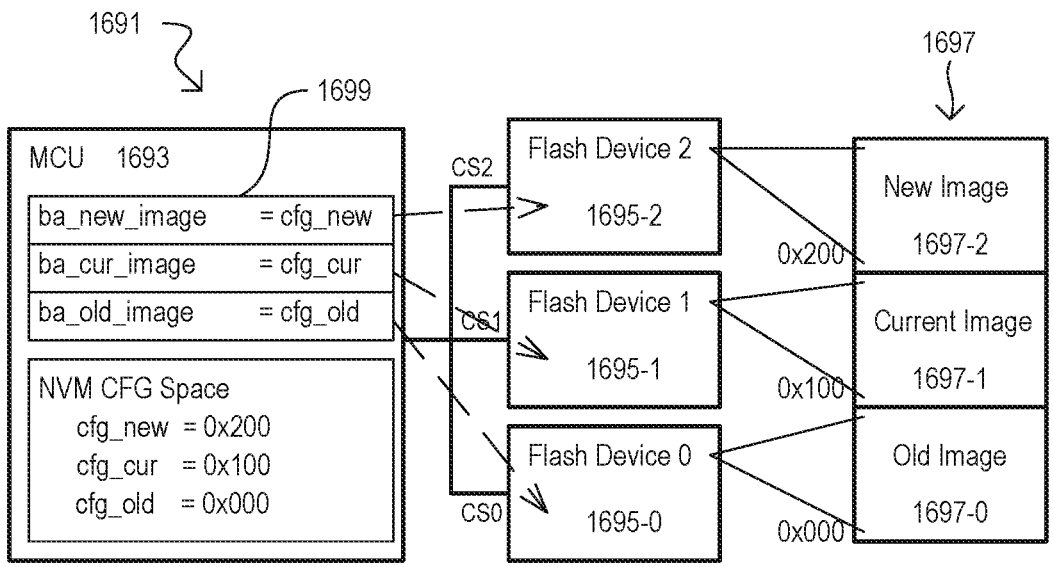
FIGS. 16A and 16B are diagrams showing a conventional system that provides FOTA updating.
Figure 16B:
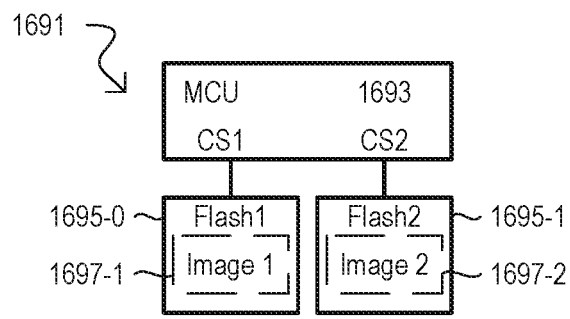

FIG. 11 is a block diagram of a system 1100 according to another embodiment. A system 1100 can include a controller (MCU) 1104 and a memory device 1002. Memory device 1002 can enable switching between at least two different firmware images (1114, 1118). As shown, controller 1104 can provide two chip select outputs (CS1, CS2) as in the conventional system shown in FIG. 16B. However, because memory device 1002 can manage switching between firmware images with a single memory device 1002 and single chip select (CS1), controller 1104 can have an extra chip select output CS2 available for other applications.

Figure 12A:
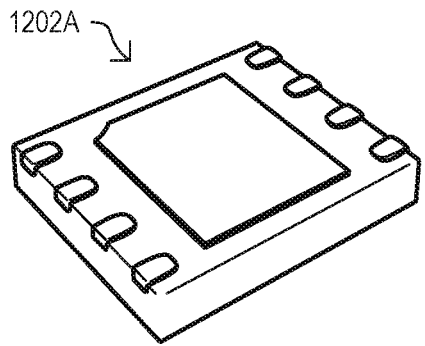
FIGS. 12A and 12B are perspective views of memory devices according to embodiments.
Figure 12B:
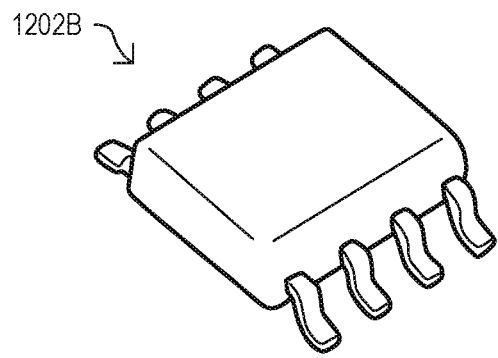

While embodiments can include systems with memory devices operating in conjunction with one or more controller devices, embodiments can also include standalone memory devices capable of enabling internal switching between different firmware images as described herein, and equivalents. While such memory devices can include multiple integrated circuits formed in a same package, in some embodiments memory devices can be advantageously compact single integrated circuits (i.e., chips). FIGS. 12A and 12B show two packaged single chip memory devices 1202A and 1202B. However, it is understood that memory devices according to embodiments can include any other suitable packaging type, including direct bonding of a memory device chip onto a circuit board substrate.

Figure 13A:
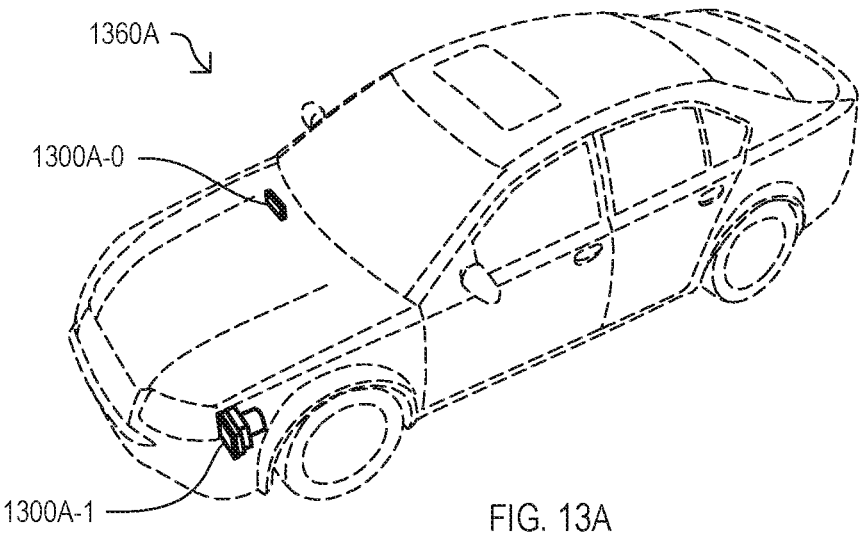
FIGS. 13A to 13C are diagrams of exemplary devices according to embodiments.
Figure 13B:
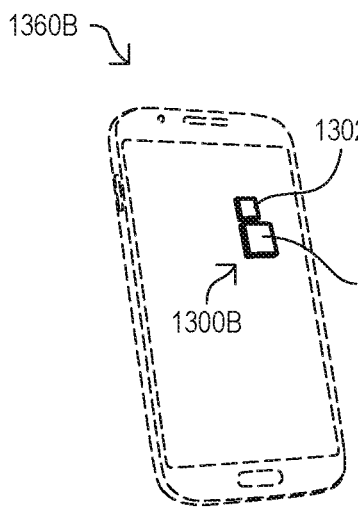
Figure 13C:
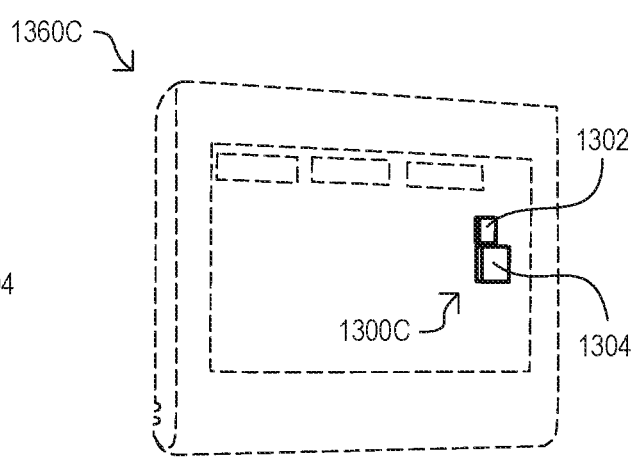

Referring to FIGS. 13A to 13C, various devices according to embodiments are shown in series of diagrams. FIG. 13A shows an automobile 1360A that can have numerous sub-systems (two shown as 1300A-0 and 1300A-1) that operate with updatable firmware. Such sub-systems (1300A-0, 1300A1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (1300A-0, 1300A-1) can include a controller and memory device and employ firmware operations as described herein, or equivalents, including FOTA type updates.

FIG. 13B shows a handheld computing device 1360B. Handheld computing device 1360B can include a system 1300B, having a memory device 1302 and controller 1304 (not shown to scale) for performing firmware updates for the device 1360B as described herein, or equivalents.

FIG. 13C shows a controller device 1360C. Controller device 1360C can be a device deployed to control industrial or residential operations. As but a few of many possible examples, controller device 1360C can control machinery on a manufacturing line, be an electronic lock for a building, control a consumer appliance, control a lighting system, or control an irrigation system. Device 1360C can include a system 1300C, having a memory device 1302 and controller 1304 (not shown to scale) for performing firmware updates for the device 1360C as described herein, or equivalents.

Figure 14:
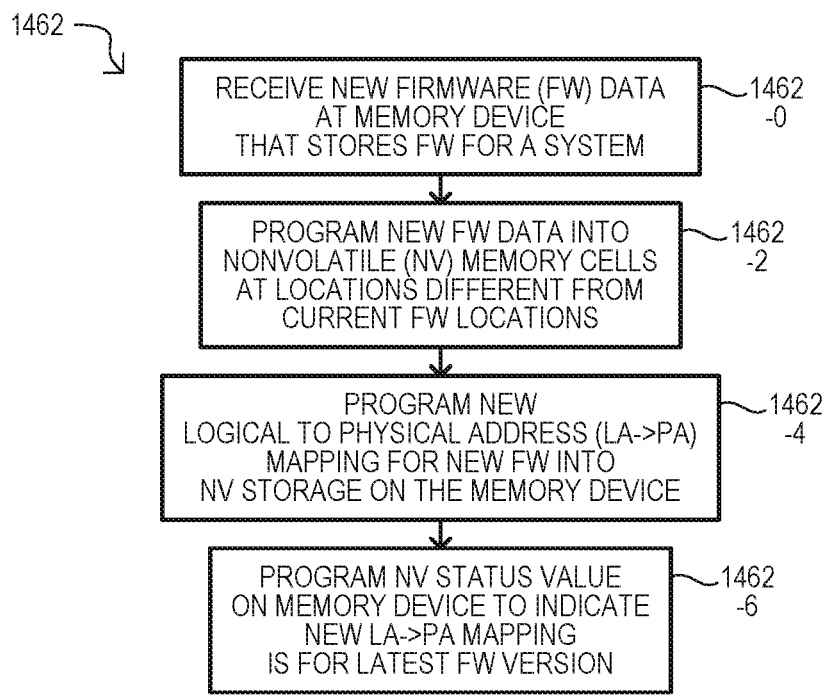
FIG. 14 is a flow diagram of a method according to an embodiment.

Referring now to FIG. 14, a method 1462 according to an embodiment is shown in a flow diagram. A method 1462 can include receiving new firmware data at a memory device that stores firmware for a system 1462-0. Such an action can include a memory device receiving program or write instructions for the firmware data via an interface on the memory device. In particular embodiments, such an action can include a memory device receiving instructions from a controller to program the firmware data at predetermined physical addresses.

Received firmware data can be programmed into nonvolatile memory cells at locations different from those that store current firmware 1462-2. In particular embodiments, such an action can include a memory device programming firmware data into one or more sectors of a flash memory array having an address range designated for the new firmware, and different from address ranges which stores current firmware. It is noted that such an operation does not include the copying of firmware data from one location in the memory cell array of memory device to another location of the memory cell array in the same memory device.

A method 1462 can also include programming a new LA→PA mapping for the new firmware into nonvolatile storage on the memory device 1462-4. In some embodiments, such an action can include programming such data into a remap history data structure which retains such mappings for previous firmware versions.

A method 1462 can also include programming a nonvolatile status value on the memory device to indicate the new LA→PA mapping is for the latest firmware version 1462-6. In some embodiments, such an action can include programming values of a pointer data structure which points to an entry in a remap history data structure.

Figure 15:
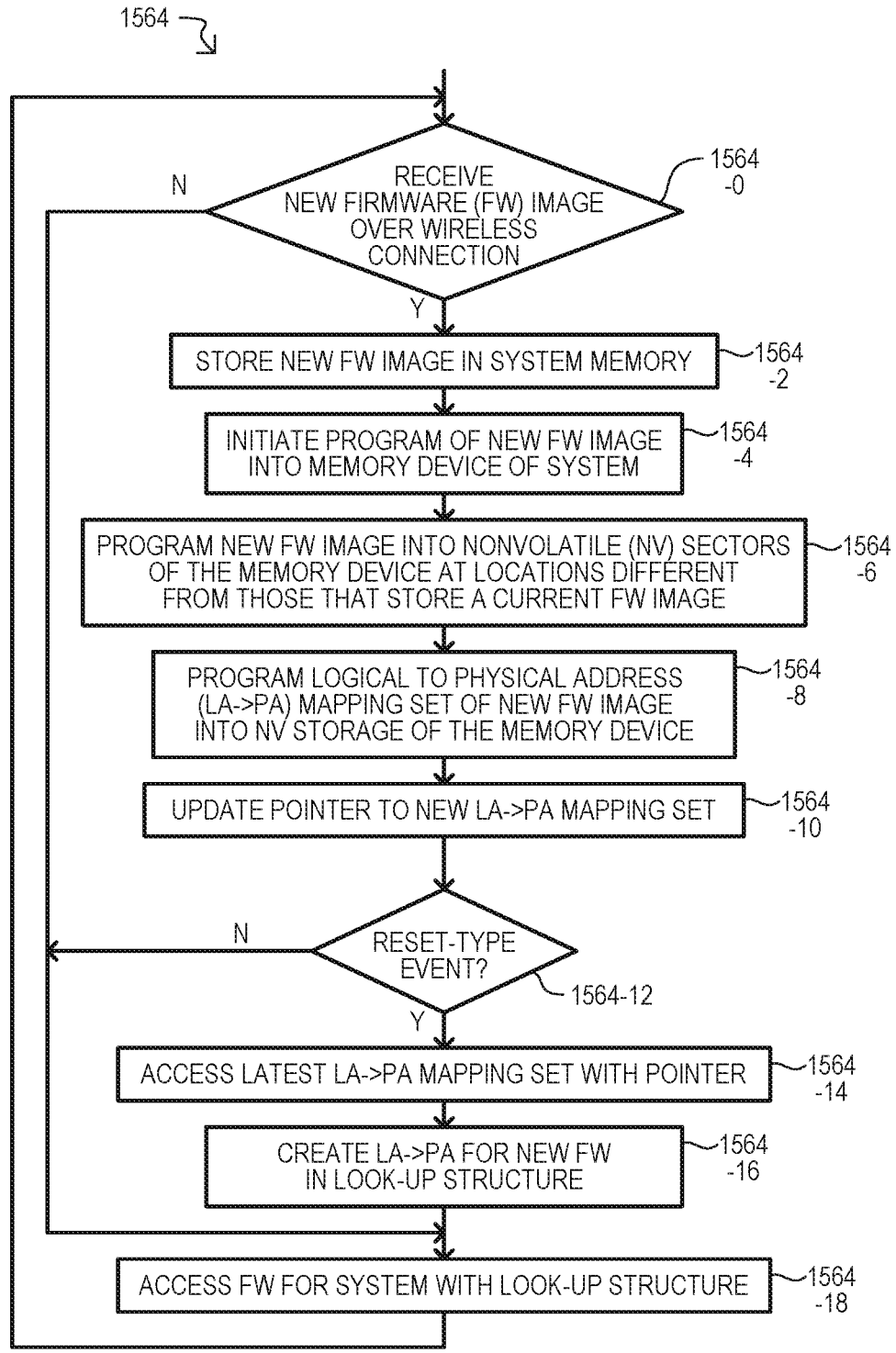
FIG. 15 is a flow diagram of a method according to another embodiment.

FIG. 15 shows a method 1564 according to another embodiment in a flow diagram. A method 1564 can be a FOTA method and can include determining when data for a new firmware image is received over a wireless connection 1564-0. Such an action can include a controller detecting when a wireless receiver of the system receives a firmware update.

If no new firmware image data is received (N from 1564-0), a method 1564 can access firmware as needed from a look-up structure 1564-18. In some embodiments, such an action can include a memory device receiving read requests to logical addresses of the firmware, and such logical addresses being translated into physical addresses with data from the look-up structure. In particular embodiments, the look-up structure can reside in volatile memory. It is understood that at this time, the system look-up structure corresponds to a current firmware image (which is to be superseded by any newly received firmware image).

If new firmware image data is received (Y from 1564-0), the new firmware image data can be stored in system memory 1564-2. In some embodiments, such an action can include storing the new firmware image data in a volatile system memory, such as a DRAM or SRAM, accessed by a controller, or the like.

A program operation of a memory device in the system can be initiated 1564-4. Such an action can include determining which particular memory device is to store the new firmware image. In some embodiments, such an action can include a controller issuing an instruction or the like to the memory device. The new firmware image can be programmed into nonvolatile sectors of the memory device at locations different from those that store a current firmware image 1564-6. Such an action can include a controller programming the firmware image stored in system memory into nonvolatile storage locations of the memory device.

An LA→PA mapping for the new firmware image can programmed into nonvolatile storage of the memory device 1564-8. Such an action can include any of those describe herein or equivalents, including programming such data into a remap history data structure which can retain mappings of previous firmware images in the same memory device.

A pointer to the new LA→PA mapping can be programmed 1564-10. Such an action can include any of those describe herein or equivalents, including setting a bit in a multi-bit value that corresponds to an entry in a remap history data structure. Such a pointer can be stored in a nonvolatile store of the memory device.

A method 1564 can determine if a reset-type event has occurred 1564-12. A reset-type event can be an event that causes memory device to reset logical address mapping from the current firmware image to the newly programmed (and "live") firmware image. A reset-type event can take any suitable form, including but not limited to, a POR event, the memory device receiving a particular instruction or register write, or a signal at a special input pin, to name only a few.

If a reset-type event is determined to not have occurred (N from 1564-12), a method 1564 can continue to access firmware with the look-up structure 1564-18, which can continue to be the firmware image to be superseded by the newly received firmware image.

If a reset-type event is determined to have occurred (Y from 1564-12), a memory device can access the latest LA→PA mapping set with the pointer 1564-14 (which corresponds to the newly received firmware image). A memory device can then create a new LA→PA look-up structure corresponding to the new firmware image 1564-16. As result, firmware accesses of 1564-18 will now be to the new firmware image.

Embodiments as described herein, can include an application programming interface (API) that can be called to execute a firmware image update as described herein. or equivalents. A new firmware image can be loaded into some arbitrary address range (addr_new_img) in a memory device which stores a current firmware image in another address range (addr_cur_img). An API can use such address information to execute a firmware update. For example, an API can have the form of "fota_switch(addr_cur_img, addr_new_img)".

Such an arrangement can enable firmware to be "relocated" within an address space of a memory device (i.e., switch from accessing the old firmware to accessing the new firmware) without having to copy firmware data from one location to another in the memory device (e.g., the firmware data is written/programmed once). The relocation operation can be atomic (i.e., a single bus transaction) and essentially instantaneous. For example, as noted herein, an instruction or register write to the memory device can put the remapping to the new firmware in place.

Embodiments of the invention can advantageously reduce or eliminate the use of multiple flash memory devices to store different firmware images, as different firmware images can be stored in one memory device, capable of making an immediate switch to a new image once it is stored. This can reduce the cost of systems, as fewer memory devices are needed. In addition, systems that would normally include multiple flash device with different firmware images on a same bus, can achieve a same result with only one device (or a fewer number of devices) on the bus. This can reduce bus capacitance, increasing performance of a system (i.e., increasing bus speeds).

Embodiments of the invention can allow for a system to provide instantaneous switching between firmware images with one memory device connected to one chip select output. This can reduce costs, as controller devices with fewer chip select outputs can be used. In addition or alternatively, there can be greater freedom in system design, as one or more chip select outputs will now be free for other uses (i.e., uses other than accessing a firmware image).

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A memory device, comprising:
   memory circuits configured to store a remap data structure that includes a map of logical addresses to physical addresses for each of a plurality of firmware versions stored in a memory cell array of the memory device, wherein the memory cell array is configured to store a first firmware version at a first set of physical addresses and a second firmware version at a second set of physical addresses, wherein the first set of physical addresses do not overlap with the second set of physical addresses; and
   a status section configured to identify one of the maps as a live map for the memory device, wherein the memory cell array and the remap data structure are formed with a same integrated circuit substrate.

2. The memory device of claim 1, further comprising control logic coupled to the memory cell array and the remap data structure, the control logic configured to enable access to the memory cell array and the remap data structure.

3. The memory device of claim 2, further comprising a volatile memory circuit configured to store the live map, wherein the control logic is configured to access the volatile memory circuit in response to a received logical address.

4. The memory device of claim 2, wherein the control logic further includes an instruction decoder configured to enable access to the remap data structure in response to a received instruction.

5. The memory device of claim 2, wherein the control logic further includes at least one configuration register accessible via a register write operation to the memory device, the at least one configuration register configured to store at least one of data for the remap data structure and data for the status section.

6. The memory device of claim 2, wherein the control logic further includes a power-on reset circuit configured to set the logical address of the live map as a most current address for one of the plurality of firmware versions stored in the memory device in response to a power-on or reset event associated with the memory device.

7. The memory device of claim 2, wherein the memory cell array comprises flash memory cells arranged into a plurality of pools, wherein the control logic is configured to vary accesses to two or more of the plurality of pools according to a wear levelling algorithm.

8. The memory device of claim 1, wherein the status section comprises at least one bit in a multi-bit pointer data structure having one bit for each of the plurality of firmware versions.

9. A method, comprising:
receiving a new firmware image at a memory device;
placing the new firmware image into second nonvolatile storage locations of the memory device, wherein the second nonvolatile storage locations do not overlap with first nonvolatile storage locations of the memory device that store a current firmware image;
placing a logical address to physical address mapping for the new firmware image into a remap data structure stored in memory circuits of the memory device, wherein the remap data structure includes a logical address to physical address mapping for the current firmware image; and
providing a first status value to indicate that the logical address to physical address mapping for the new firmware image is a valid firmware image and a second status value to indicate that the logical address to physical address mapping for the current firmware image is an invalid firmware image.

10. The method of claim 9, wherein the placing of the new firmware image into the second nonvolatile storage locations includes programming sectors of a flash memory device.

11. The method of claim 9, wherein the providing of the first status value includes programming at least one bit in a multi-bit pointer data structure, wherein the multi-bit pointer data structure includes one bit for each logical address to physical address mapping stored in the memory device.

12. The method of claim 9, wherein the placing of the logical address to physical address mapping for the new firmware image includes at least one of receiving a predetermined instruction and data at the memory device and writing data to at least one predetermined register of the memory device.

13. The method of claim 9, wherein the providing of the first status value for the new firmware image includes at least one of receiving a predetermined instruction and data at the memory device and writing data to at least one predetermined register of the memory device.

14. The method of claim 9, further including in response to a predetermined event, generating another logical address to physical address mapping to place in a volatile memory, the other logical address to physical address mapping based on the logical address to physical address mapping of the new firmware image, and accessing the volatile memory to read data from the new firmware image.

15. The method of claim 14, wherein the predetermined event includes one of a power-on or reset operation for the memory device, receiving a predetermined instruction at the memory device, and writing data to at least one predetermined register of the memory device.

16. A system, comprising:
a nonvolatile memory device including a memory cell array configured to store different firmware images that are accessible via different physical addresses, a mapping section configured to store a logical address to physical address mapping[s] for each of the different firmware images, and a status section configured to store data identifying a first firmware image to be accessed by the system;
a transceiver configured to receive a second firmware image over a wireless network; and
a processor circuit configured to execute instructions to place the second firmware image in the memory cell array without disturbing the first firmware image stored in the memory cell array, place logical address to physical address mapping for the second firmware image in the mapping section, and cause the status section to indicate a switch from use of the first firmware image to use of the second firmware image, wherein the logical address to physical address mapping for the second firmware image is to be used to access the second firmware image.

17. The system of claim 16, wherein the processor circuit is configured to place the logical address to physical address mapping for the second firmware image in the mapping section via at least one of issuing a predetermined instruction and data to the nonvolatile memory device and writing data to at least one predetermined register of the nonvolatile memory device.

18. The system of claim 16, wherein the processor circuit is configured to cause the status section to indicate the switch via at least one of issuing a predetermined instruction to the nonvolatile memory device and writing data to at least one predetermined register of the nonvolatile memory device.

19. The system of claim 16, wherein prior to the receipt of the second firmware image, the processor circuit is configured to access the first firmware image stored in the nonvolatile memory device with a chip select signal, and after the receipt of the second firmware image, the processor circuit is configured to access the second firmware image with the chip select signal.

20. The system of claim 16, wherein the nonvolatile memory device includes a pool for each of the different firmware images, a different mapping section for each pool, and a different status section for each pool, wherein each status section comprises at least one bit in a multi-bit pointer data structure having one bit for each entry of a corresponding mapping section.

\* \* \* \* \*